H. M. SCHEIBE.
SYSTEM OF LUBRICATION.
APPLICATION FILED DEC. 31, 1913.
1,199,431.
Patented Sept. 26, 1916.
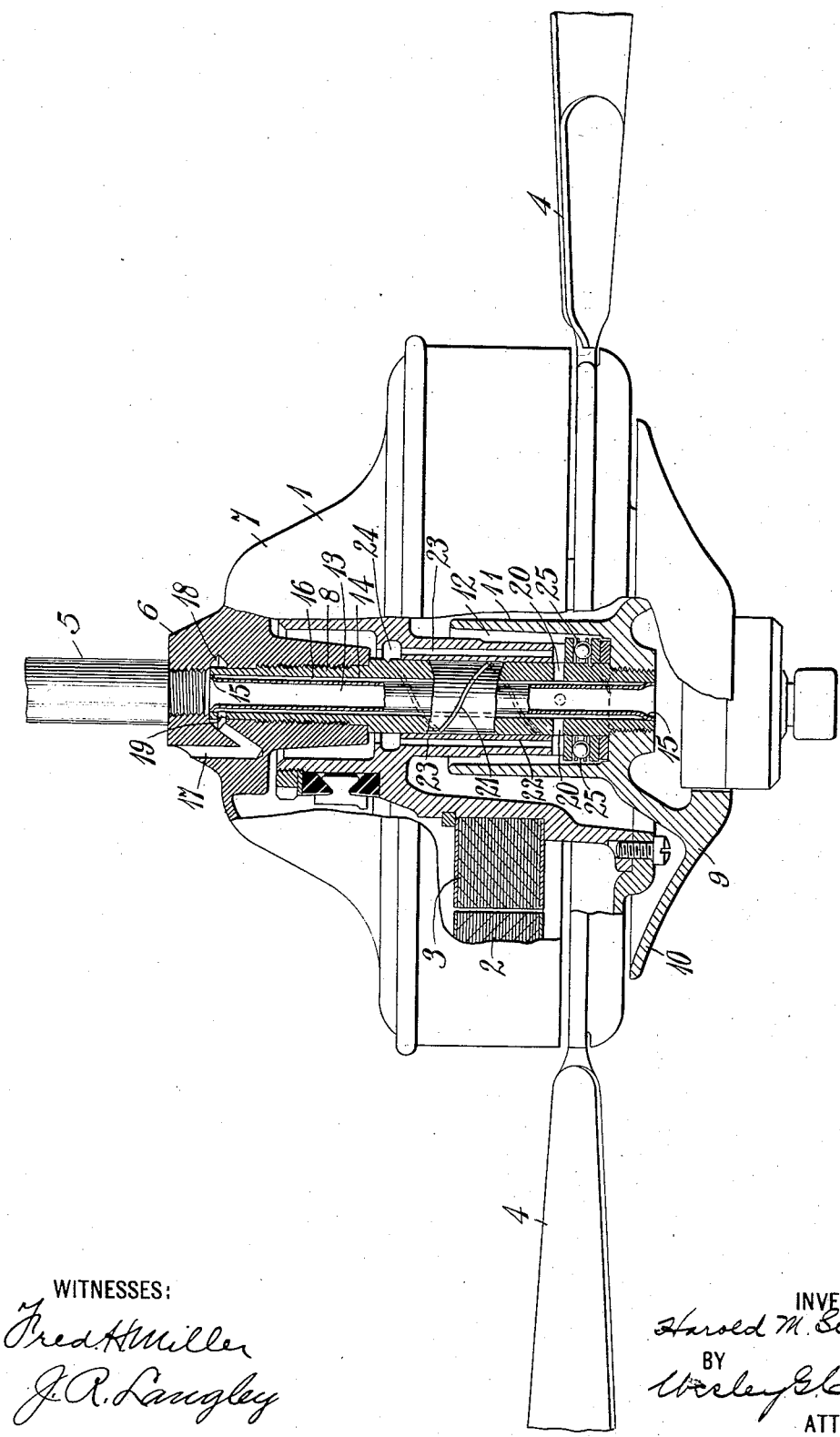
WITNESSES:
Fred H Miller
J. R. Langley
INVENTOR
Harold M. Scheibe
BY
Wesley G. Carr
ATTORNEY

UNITED STATES PATENT OFFICE.

HAROLD M. SCHEIBE, OF SOMERVILLE, MASSACHUSETTS, ASSIGNOR TO WESTINGHOUSE ELECTRIC AND MANUFACTURING COMPANY, A CORPORATION OF PENNSYLVANIA.

SYSTEM OF LUBRICATION.

1,199,431.  Specification of Letters Patent.  Patented Sept. 26, 1916.

Application filed December 31, 1913. Serial No. 809,651.

*To all whom it may concern:*

Be it known that I, HAROLD M. SCHEIBE, a citizen of the United States, and a resident of Somerville, in the county of Middlesex and State of Massachusetts, have invented a new and useful Improvement in Systems of Lubrication, of which the following is a specification.

My invention relates to systems of lubrication, and it has for its object to provide a simple and efficient means for accurately determining the proper amount of oil to be supplied to an oil receptacle, access to which is inconvenient or impossible.

The operation of various kinds of machines requires that the bearings be equipped with receptacles for a sufficient supply of oil to lubricate the bearings for a relatively long period without replenishing the same. The construction of such machines as, for example, ceiling fans makes it necessary to locate the bearings and oil wells at inaccessible points in the structure. It is highly desirable that the oil well may be filled at various times without dismantling the structure and without causing the oil to overflow the surrounding parts. I provide a system by means of which it is impossible to cause the oil well to overflow and which insures that the proper amount of oil shall be supplied to the well. The height of the oil, or its "head," operates, through a column of air, to automatically stop the flow of oil into the supply opening at the exterior of the structure. The oil first enters an inverted siphon structure or trap to which the pressure of the oil in the well is transmitted by the air column above referred to.

In the drawings, the single figure is a sectional view of an electric fan with my invention applied thereto.

An electric fan 1 of the ceiling type comprises the stationary field structure 2 of an electric motor and the armature 3 which carries a set of fan blades 4. The fan is supported by a tube 5 which is threaded into the upper portion of a member 6 that is integral with the end casing 7. A tubular shaft 8, which is threaded into the lower portion of the member 6, supports, at its lower end, a member 9 that is provided with a radial flange 10 to inclose the bottom of the fan structure. The member 9 is also provided with a vertical cylindrical flange 11 which forms the outer wall of an oil well 12. A tube 13, having an external diameter that is less than the internal diameter of the shaft 8, occupies the bore 14 of the latter. The end portions 15 of the tube 13 are expanded and soldered or brazed to the shaft 8 to form an annular duct 16 between the tube 13 and the shaft.

The member 6 is provided with a duct 17 which has the form of an inverted siphon. The inner end of the duct 17 opens into an annular groove 18. The shaft 8 is provided with an opening 19 which connects the groove 18 and the duct 16. The duct 16 is connected to the oil well 12 by a series of openings 20 in the wall of the shaft 8. The oil is carried upward from the well 12 by means of a helical groove 21 upon the exterior surface of the shaft 8.

The armature 3 is provided with a bearing member 22 which surrounds the stationary shaft 8 and is provided with ducts 23 which connect the well 12 with an annular groove 24. The bearing member 22 is supported by a ball bearing that is indicated at 25 and is below the normal level of the oil.

When it is desired to fill the well, oil is introduced into the outer end of the duct 17 through which it flows to the groove 18, and then through the opening 19, the annular duct 16 and openings 20 into the well 12. It will be understood that the oil flows freely through the duct 17 because of the height of the outer end above the inner end. It may be noted also that the duct 16 is much larger in cross sectional area, than the duct 17. This construction insures that the quantity of oil which may flow through the duct 17 will occupy only a portion of the space of the duct 16, and that a quantity of air will remain in the latter duct during the flow of oil. These conditions will be maintained until the level of the oil in the well is above the openings 20. Then the gradually increasing static head of the oil in the well causes the level of the oil in the duct 16 to rise above the openings 20 and thereby shorten the column of air contained in the duct 16 and put the same under pressure. This pressure opposes the flow of oil through the opening 19. When the pressure of the air becomes sufficiently high to overcome the pressure caused by the head of oil in the duct 17, oil ceases to flow through the latter and any overflow takes place at the outer end of the duct where it may be readily perceived. The height of the oil in the well at which the flow in the duct 17 is cut off, may be determined by properly proportioning the various parts.

While I have shown my invention as applied to a fan motor, it may be applied equally as well to various other machines. It is understood that the details of my invention may be varied within the limits of the appended claims.

I claim as my invention:

1. In a system of lubrication, the combination with an oil well, and a member having a supply opening, of unitary means for connecting said opening to said oil well and for automatically controlling the flow of oil through said opening.

2. In a system of lubrication, the combination with a receptacle for liquids, and a member having a supply opening above said receptacle, and of a duct connecting said receptacle to said opening, said duct embodying means for preventing the flow of liquid through said opening when the liquid in said receptacle reaches a predetermined height.

3. In a system of lubrication, the combination with a receptacle for oil and a member having a supply opening connected to said receptacle, of means interposed between said opening and said receptacle for placing a quantity of air under pressure to control the flow of oil through said opening.

4. In a system of lubrication, the combination with a receptacle for liquids, and a member having a supply opening, of means comprising a duct having a depressed portion for connecting said opening to said receptacle and for controlling the flow of a liquid through said opening.

5. In a system of lubrication, the combination with a receptacle, a member provided with a supply opening above said receptacle, of a duct for connecting said opening to said receptacle, the flow of a liquid through said opening being controlled by the air pressure in said duct.

6. In a system of lubrication, the combination with a receptacle, of a duct for conducting liquid to said receptacle, said duct being provided with an opening above said receptacle, and comprising means dependent upon the air pressure in said duct for stopping the flow of a liquid through said opening when the liquid in said receptacle reaches a predetermined height.

7. In a system of lubrication, the combination with an oil well, of a member provided with a supply opening above said oil well, means for connecting said opening and said oil well, said means comprising a duct having an intermediate portion that is lower than the remainder of said duct, and a second duct having a cross-sectional area larger than that of the first duct.

In testimony whereof I have hereunto subscribed my name this 24th day of December, 1913.

HAROLD M. SCHEIBE.

Witnesses:
M. B. HOWARD,
L. O. FRANCIS.